(12) United States Patent
Cermak et al.

(10) Patent No.: US 6,852,036 B2
(45) Date of Patent: Feb. 8, 2005

(54) ROLLING BOOT AND ROLLING BOOT ASSEMBLY

(75) Inventors: Herbert Cermak, Bessenbach (DE); Michael Zierz, Freiensteinau (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 10/394,991

(22) Filed: Mar. 21, 2003

(65) Prior Publication Data

US 2003/0181247 A1 Sep. 25, 2003

(30) Foreign Application Priority Data

Mar. 22, 2002 (DE) ......................................... 102 12 898

(51) Int. Cl.[7] ............................................... F16D 3/06
(52) U.S. Cl. ..................................... 464/173; 464/167
(58) Field of Search ................................ 464/162, 167, 464/168, 172, 173, 906; 277/635; 403/50, 51

(56) References Cited

U.S. PATENT DOCUMENTS

| 2,702,996 | A | * | 3/1955 | Edward ................... 277/635 X |
| 2,869,342 | A | * | 1/1959 | Stillwagon, Jr. ............ 464/173 |
| 3,037,798 | A | * | 6/1962 | Cooper |
| 3,714,797 | A | * | 2/1973 | Fisher ......................... 464/906 |
| 3,795,118 | A | | 3/1974 | Kesl et al. |
| 3,988,906 | A | * | 11/1976 | Smith .......................... 464/88 |
| 4,755,078 | A | * | 7/1988 | Blumberg et al. ....... 464/173 X |
| 6,251,021 | B1 | * | 6/2001 | Jacob ...................... 464/167 X |
| 6,286,555 | B1 | * | 9/2001 | Pauker et al. ............... 138/109 |
| 6,306,045 | B1 | | 10/2001 | Jacob |
| 6,379,255 | B1 | * | 4/2002 | Cermak et al. ......... 464/162 X |
| 6,426,033 | B1 | | 7/2002 | Wette et al. |

* cited by examiner

Primary Examiner—Greg Binda

(57) ABSTRACT

The invention relates to a rolling boot (26) and to a rolling boot assembly including such a rolling boot and two attaching parts. The rolling boot (26) comprises a first axially flexible portion (38) having a first radially outer collar (27), a second axially flexible portion (39) having a second radially outer collar (28), and an approximately cylindrical connecting portion (40) which adjoins the two portions (38, 39) on the radial inside. The rolling boot assembly is provided with a first attaching part (24) comprising a fixing portion (34) which opens towards the second portion and which, from the outside, continuously approaches the first portion (38) of the rolling boot (26) in the direction of the first collar (27), as well with a second attaching part (25) comprising a fixing portion (37) which opens towards the first portion (38) and which approaches the second portion (39) in the direction of the second collar (28).

22 Claims, 5 Drawing Sheets

ROLLING BOOT AND ROLLING BOOT ASSEMBLY

TECHNICAL FIELD

The invention relates to a rolling boot and to a rolling boot assembly for sealing a plunging unit with a long plunge or for sealing a plunging joint.

BACKGROUND OF THE INVENTION

U.S. Pat. No. 6,306,045 discloses a plunging unit which comprises a universal joint with an outer part, an inner part and means for transmitting torque between the outer part and inner part, as well as a journal firmly connected to the inner part and an axially displaceable shaft connected in a rotationally fast way relative to the journal by means of rolling contact members.

For sealing purposes, a convoluted boot is provided which comprises a first collar at the joint end, a second collar at the shaft end and a wall which connects the two collars and comprises folds. The first collar of the convoluted boot is secured by a first attaching part to the outer part of the universal joint, and the second collar of the convoluted boot is secured to the sleeve of the plunging assembly. The convoluted boot prevents dirt from entering the joint and plunging space, and prevents lubricant from leaving the joint and plunging space.

U.S. Pat. No. 6,426,033 discloses a rolling boot made of a thermoplastic elastomer for sealing a universal joint. The rolling boot comprises a first collar with a larger diameter to be secured to an outer joint part of the universal joint and a second collar with a smaller diameter to be secured to a shaft firmly connected to the inner part of the universal joint, as well as a wall in the shape of half a torus for connecting the collars. The rolling boot is produced from a thermoplastic elastomer by injection molding or blow molding.

Using convoluted boots made of a thermoplastic material for sealing the above-mentioned plunging units or plunging joints, especially when such units or joints are used in propeller shafts, is problematical in that the high rotational speeds lead to failure of the convoluted boot. Rolling boots, on the other hand, made of rubber are able to withstand the high rotational speeds, but they are not suitable for compensating for long plunging distances.

SUMMARY OF THE INVENTION

The present invention provides a rolling boot and a rolling boot assembly for sealing a plunging unit or a plunging joint with a long plunge. The rolling boot/rolling boot assembly is very wear-resistant, even at high rotational speeds.

In one embodiment, a rolling boot with a first axially flexible portion comprising a first radially outer collar, a second axially flexible portion comprising a second radially outer collar, and an approximately cylindrical connecting portion which adjoins the two portions on the radial inside of the two portions is provided. One advantage of this embodiment is that the rolling boot, by means of the two axially flexible portions, is able to compensate for axial displacements of the attaching parts to be attached to the two collars. Because rolling boots are made of a resilient rubber, they are wear-resistant, even at high rotational speeds. As a result, even if the plunging unit or the plunging joint is in operation for a long period of time, the rolling boot ensures that the lubricant cannot escape from the sealed space and that dirt cannot enter the space.

According to a further embodiment of the invention, the connecting portion is provided with a reinforcing portion. In this way, it is ensured that at high rotational speeds of the plunging unit or of the plunging joint, such as occurs in propeller shafts, the rolling boot in the region of the connecting portion is held radially inward and does not bulge outward. The reinforcing portion can be substantially centered between the two collars, as a result of which the rolling boots acquires a greater degree of stability when rotating. In another embodiment, the reinforced portion is provided in the form of an external sleeve or internal sleeve. Alternatively, the reinforced portion can also be integrated into the wall of the connecting portion, for instance by vulcanising in a fiber or fabric sleeve. Ribs or naps can also be formed on the inside of the sleeve to protect the sleeve against chafing.

According to another embodiment, the connecting portion is axially displaceable relative to a journal positioned therein. This is advantageous in that, when the collars are axially displaced relative to one another, the connecting portion of the rolling boot is able to move freely and thus is able to assume the position with the least amount of stress. Alternatively, the connecting portion can also be axially secured by the reinforcing portion on a journal positioned in the connecting portion. In this way, the connecting portion is held in an axially defined position, which can be advantageous, especially in plunging units with a shorter plunge.

According to a further embodiment of the invention, the first portion and the second portion of the rolling boot are axially open towards one another in an annular-shell-shaped way. In this way, it is ensured that the wall of the entire rolling boot is curved in one sense only, while at the same time permitting the two collars to be axially displaceable relative to one another.

According to an even further embodiment of the invention, the diameter of the first collar is greater than the diameter of the second collar, and the second collar can be inserted into the first portion. With a given length of a plunging unit or plunging joint to be attached, there is thus achieved a maximum axial plunging capacity of the rolling boot. In an advantageous embodiment, the smallest radius of curvature of the first portion in a longitudinal section is greater than the smallest radius of curvature of the second portion in a longitudinal section.

The present invention also provides a rolling boot assembly having a rolling boot with a first axially flexible portion comprising a first radially outer collar, a second axially flexible portion comprising a second radially outer collar and an approximately cylindrical connecting portion which adjoins the two portions on the radial inside of the two portions. The assembly also includes two attaching parts, wherein a first attaching part comprises a structural portion which is open towards the second portion of the rolling boot, which, from the outside, tangentially approaches the first portion of the rolling boot in the direction towards the first collar, and which serves to receive the first portion of the rolling boot. The structural portion can be cylindrical.

The advantage of this rolling boot assembly with two attaching parts is that the rolling boot can simply be attached to two opposed attaching parts of a plunging unit. The first and the second attaching parts can be formed out of plate metal. By means of a cylindrical or conically widening structural portion of the first attaching part, the first portion of the rolling boot can be provided with stability and guidance, as a result of which the rolling boot is prevented from bulging out when rotating. The first collar of the rolling boot can be provided in the form of a bead which engages a correspondingly designed crimping of the first attaching part. In this way, the rolling boot is securely connected to the first attaching part across the entire circumference.

In one embodiment, the second attaching part comprises a structural portion which is open towards the first portion of the rolling boot and which, from the outside, tangentially approaches the second portion of the rolling boot and serves to receive the second portion of the rolling boot. The structural portion can be cylindrical. In this way, in the plunged condition of the plunging unit, the second portion of the rolling boot is securely held in a defined position without coming into contact with the opposed first portion of the rolling boot. When the rolling boot assembly is extended, the second portion of the rolling boot is rolled out along an inner journal. The second collar of the rolling boot can be provided in the form of a bead which engages a correspondingly designed crimping at the attaching part end which is closer to the first portion. In this way, the rolling boot is securely connected to the second attaching part across the entire circumference.

According to a further embodiment of the invention, the greatest outer diameter at the open structural portion of the second attaching part is smaller than the smallest inner diameter at the open structural portion of the first attaching part and, when the attaching parts are articulated relative to one another up to a maximum operating angle, there still exists a radial gap between the first attaching part and the second attaching part in the region where they are closest to each other. In this way, even in the plunged condition of the plunging unit, and even if the two attaching parts at least partially axially overlap, the joint to be attached can be articulated without the two attaching parts contacting one another or becoming damaged. Because of the overlap of the two attaching parts, the length of a journal positioned in the rolling boot can be reduced to a minimum, which has a positive effect on the critical shaft speed.

A further advantageous assembly comprises at least one plunging assembly including a sleeve with outer grooves, a journal with inner grooves and balls guided in pairs of outer grooves and inner grooves, as well as a rolling boot assembly according to any one of the above embodiments, wherein the second attaching part is connected to the sleeve of the plunging assembly and wherein the first attaching part is at least indirectly connected to the journal.

An advantage of the assembly is that the rolling boot is able to compensate for axial plunging paths even directly between the sleeve and the journal, and even at high rotational speeds the assembly features good wear properties.

A still further advantageous assembly comprises at least one constant velocity joint including an outer part having outer tracks, an inner part having inner tracks and being connected to a journal, and torque transmitting balls or rollers, as well as a rolling boot assembly according to any one of the above embodiments, wherein the first attaching part is connected to the outer part of the constant velocity joint and wherein the second attaching part is at least indirectly connected to the journal.

This embodiment permits the rolling boot to compensate for axial displacement paths even directly between the outer part of the joint and the journal, with the rolling boot comprising advantageous wear properties even at high rotational speeds.

According to a further embodiment of the invention, the journal of the plunging assembly is directly connected to the inner part of the constant velocity joint. The constant velocity joint can be provided in the form of a fixed ball joint. The convoluted boot extends over the space between the outer part of the joint and the sleeve of the plunging assembly.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

(A) with an aligned universal joint (B) with an articulated universal joint.

Figure 1:
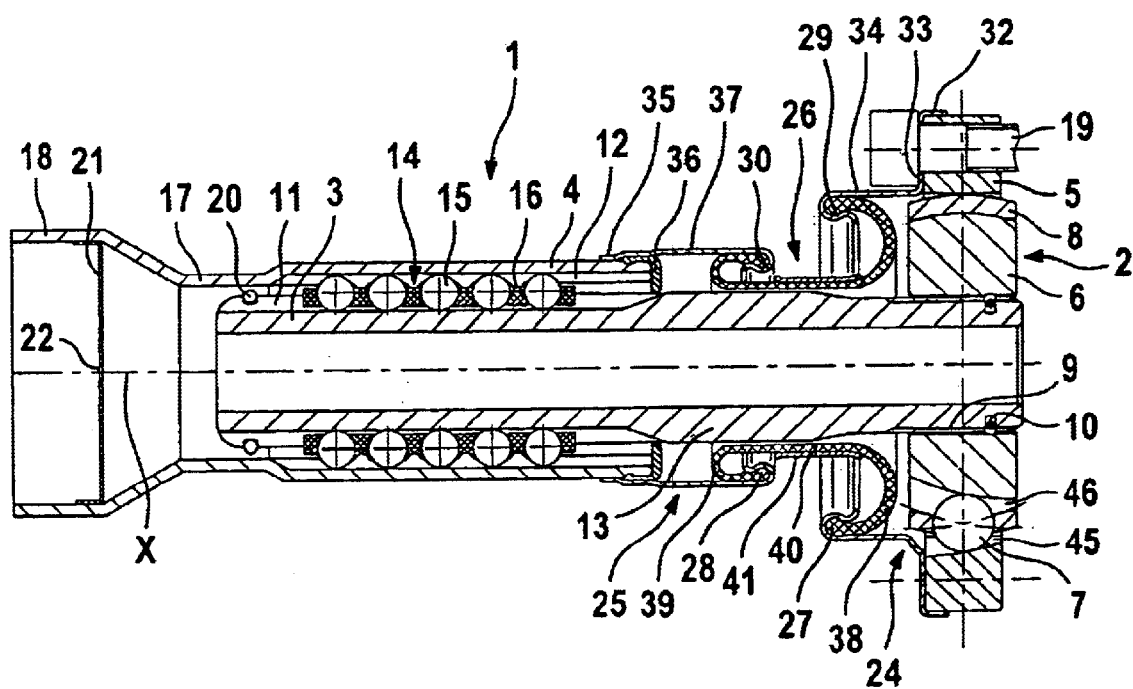
FIG. 1 is a longitudinal section through a plunging assembly with a rolling boot assembly.

FIG. 3 shows an axially extended plunging assembly according to FIG. 1:

(A) with an aligned universal joint (B) with an articulated universal joint.

Figure 4:
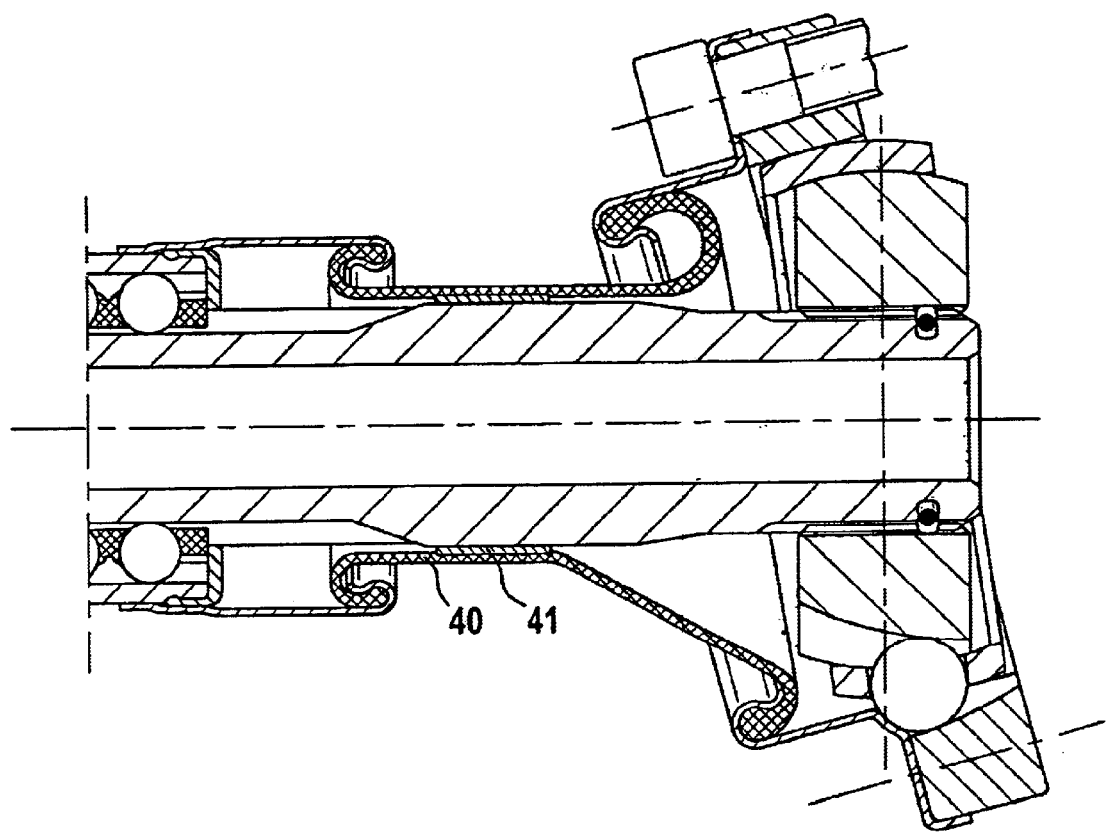

FIG. 4 shows a detail of one embodiment of the connecting portion of the rolling boot.

Figure 5:
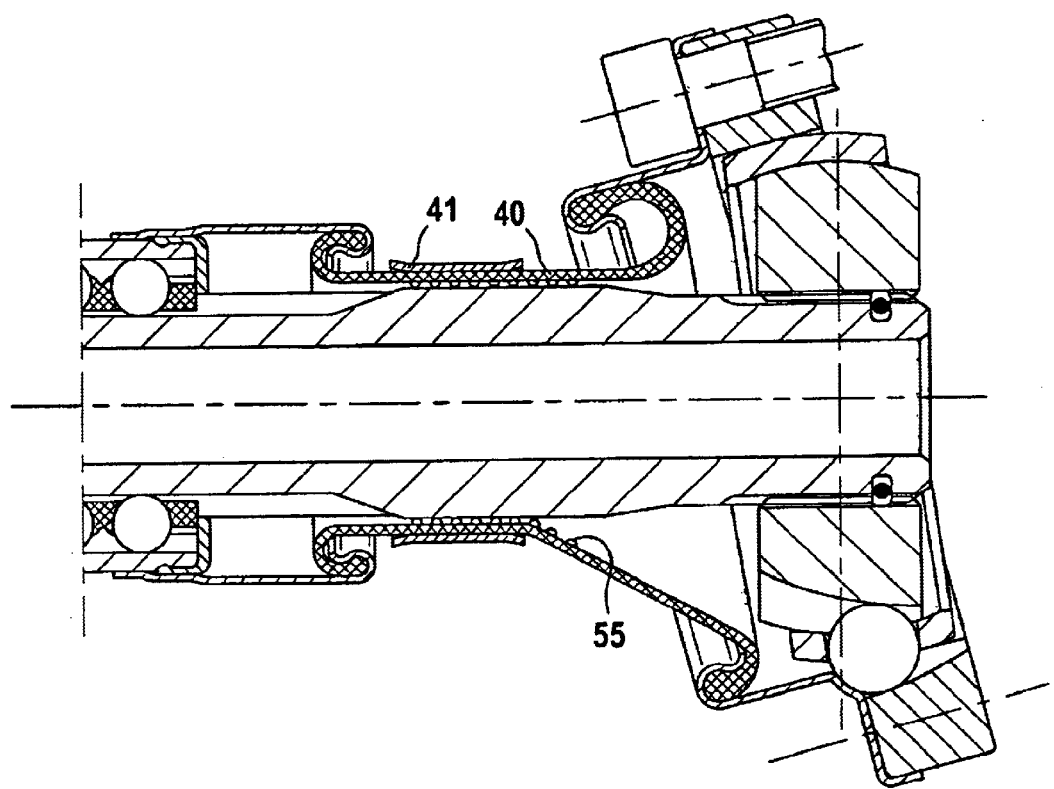

FIG. 5 shows a detail of another embodiment of the connecting portion of the rolling boot.

DETAILED DESCRIPTION OF THE INVENTION

Figure 2A:
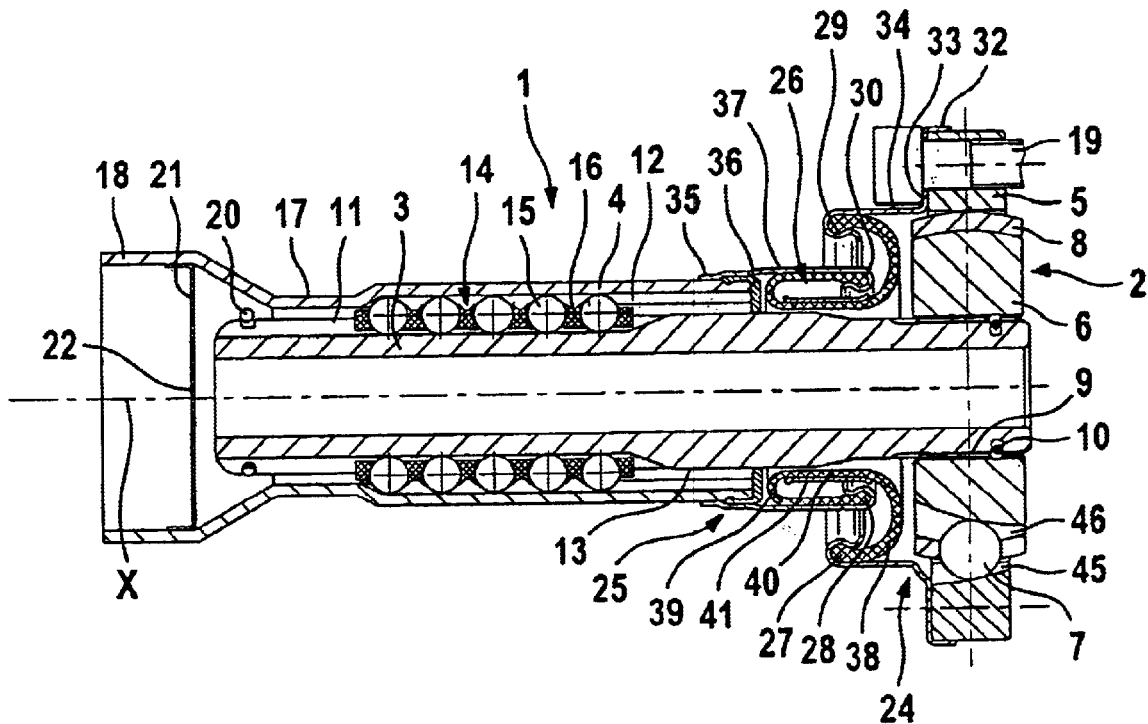
FIG. 2 shows an axially shortened plunging assembly according to FIG. 1.

FIGS. 1 to 3 will be described jointly below. They show a plunging assembly 1 which forms part of a CV-jointed driveshaft for the driveline of a motor vehicle. The plunging assembly 1 is connected to a constant velocity joint 2 provided in the form of a fixed joint. Other types of constant velocity joints could also be used. The plunging assembly 1 comprises a journal 3, a sleeve 4 and torque transmitting balls 15 which are held in a cage 16.

The journal 3 is a hollow journal and at its end facing away from the constant velocity joint 2, it comprises inner grooves 11 which extend parallel to the longitudinal axis X. A radial thickening 13 is formed on the end of the inner grooves 11 facing the joint. In the inner grooves 11 there is an axially displaceable held cage unit 14 which, per inner groove, comprises a plurality of balls 15 arranged one behind the other in an annular cage 16 holding the balls 15.

The sleeve 4 comprises outer grooves 12 which are circumferentially distributed at the joint end; they extend parallel to the longitudinal axis X and are arranged opposite the inner grooves 11 of the journal 3. Each pair of radially opposed grooves 11, 12 is engaged by a plurality of balls 15 which transmit torque between the sleeve 4 and the journal 3. The rolling path of the cage unit 14 relative to the journal 3 is delimited at the joint end by the radial thickening 13 of the journal 3, and at the shaft end by a radial recess 17 of the sleeve 4 which serves as a stop for the cage 16 and the balls 15 respectively. The sleeve 4 is closed by a cover 21 which prevents lubricant from running from the space of the cage unit 14 into the interior of the adjoining shaft attaching piece 18. To permit the equalization of pressure between the chamber formed by the plunging unit 1 and the interior of the shaft to be attached during the sliding-in and sliding out movement of the plunging assembly 1, the cover 21 is provided with a central pressure equalizing aperture 22.

The constant velocity joint 2 comprises an outer part 5, an inner part 6, balls 7 which engage suitable outer tracks 45 of the outer part 5 and radially opposed inner tracks 46 of the inner part 6 for torque transmitting purposes, as well as a cage 8 for holding the balls 7 in the homokinetic central plane. The constant velocity joint 2 is provided in the form of a fixed joint with counter tracks. The pairs of ball tracks 45, 46 open across the circumference alternately in axially opposed directions, with only one of the pairs being shown in a sectional view. The inner part 6 comprises a bore 9 with longitudinal splines into which the journal 3 is inserted in a rotationally fast way. The journal 3 and the inner part 6 are axially connected to one another by a securing ring 10. Other mechanisms for connecting the journal 3 and inner part 6 are also contemplated.

To prevent any lubricant from escaping from the joint and plunging space and to prevent dirt from entering the space, there is provided an inventive sealing assembly which comprises a first attaching part 24 adapted to be connected to the outer part 5 of the constant velocity joint 2, a second attaching part 25 adapted to be connected to the sleeve 4 of the plunging unit 1, as well as a rolling boot 26 sealingly connecting the two attaching parts 24, 25. The two attaching parts 24, 25 are less resilient than the boot material and can be produced, for example, by deformation from plate metal. At the joint end, the rolling boot 26 comprises a first collar 27, a second collar 28 at the sleeve end and a boot wall connecting the two collars. The two collars 27, 28 are provided in the form of beads which are engaged by correspondingly designed crimpings 29, 30 of the respective attaching parts 24, 25.

The first attaching part 24 comprises a cylindrical collar portion 32 which centeringly embraces the outer part 5 of the constant velocity joint 2 and which is followed by a radially inwardly extending flange portion 33 which is in surface contact with the end face of the outer part 5 and is held by fasteners such as bolts 19. The disc-shaped flange portion 33 changes into a cylindrical fixing portion 34 which is provided with the inwardly directed crimping 29 engaged by the bead-shaped first collar 27 of the rolling boot 26.

The second attaching part 25 comprises a sleeve-shaped clamping portion 35 which is designed according to the outer contour of the sleeve 4 and is secured on the radial outside of the sleeve. Part of the inwardly directed cover 36 can be clamped in underneath the sleeve-shaped clamping portion 35. Further, along towards the constant velocity joint 2, the second attaching part 25 finally changes into a cylindrical fixing portion 37 whose outer diameter approximately corresponds to the outer diameter of the sleeve 4. At the end of the second attaching part 25, which end faces the constant velocity joint 2, there is provided the inwardly directed crimping 30 which is engaged by the bead-shaped second collar 28 of the rolling boot 26.

The first collar 27 of the rolling boot 26 is followed by a first wall portion 38 in the shape of half a torus which, if viewed in a longitudinal section, comprises a greeter radius of curvature than the second wall portion 39 which is also shaped like a half torus, when viewed in a longitudinal section as shown. The smallest radius of curvature of the first portion 38, in longitudinal sectional view, can be greater than the smallest radius of curvature of the second portion 39, in longitudinal sectional view. The first wall portion 38 serves to compensate for angular movements of the constant velocity joint 2. The second collar 28 is followed by a second wall portion 39 in the shape of half a torus which, if viewed in a longitudinal section, comprises a smaller radius of curvature than the first one 38 and which, substantially, serves to compensate for plunging movements of the shaft relative to the journal 3 and which, depending on the plunging condition of the plunging assembly 1, is positioned closer to, or further away from, the first collar 27. The wall portions 38, 39, by means of their convex outer faces, point in axially opposed directions relative to the joins 2 and the plunging unit 1. In other words, the wall portions 38,39 are axially open towards each other in an annular shell-like way. Between the wall portions 38,39, there is positioned a central wall portion 40 which is cylindrical, which extends coaxially relative to the thickening 13 and rests closely thereagainst. On the radial outside of the central wall portion 40 there is provided a reinforcing portion in the form of a sleeve or ring 41 which prevents the rolling boot 26 from bulging out when the assembly rotates at a high speed. The central wall portion 40 can, with radial play, be axially displaceable relative to the thickening 13 or it can be clamped to the thickening 13 by means of the reinforcing ring 41. The reinforcing portion 41 can also be integrated into the wall of the connecting portion 40, and can rest against the radial inside of the central wall portion 40 as shown in FIG. 4. The inside of the connecting portion 40 can also include rib or nap-like reinforcements 55, which provide protection against chaffing as shown in FIG. 5.

Between the cylindrical fixing portion 37 of the second attaching part 25 and the journal 3, there is formed an annular chamber which serves to accommodate the second wall portion 39 of the rolling boot 26 when the plunging unit 1 is in the plunged condition. As can be seen in FIG. 2, the rolling boot 26, in the completely plunged condition of the plunging unit 1, touches in osculation the inner face of the cylindrical portion 37, starting from the second collar 28 held at the end of the second attaching part 25, then extends in the shape of half a torus and, thereafter, extends with a radial gap 50 coaxially relative to the journal 3. The gap 50 ensures that the rolling boot 26 is axially movable relative to the journal 3. The inner diameter of the fixing portion 34 of the first attaching part 24 is greater than the outer diameter of the fixing portion 37 of the second attaching part 25, so that the latter, in the completely plunged condition, while at least partially overlapping, is able to enter the first attaching part 24. In this way, it is ensured that, with a given length of the rolling boot 26, the axial plunging capacity is considerable. The first wall portion 38 of the rolling boot 26, which wall portion is at the joint end, touches in osculation the inner face of the cylindrical fixing portion 34, starting from the first collar 27, and then extends in the shape of half a torus relative to the central wall portion 40.

Figure 2B:
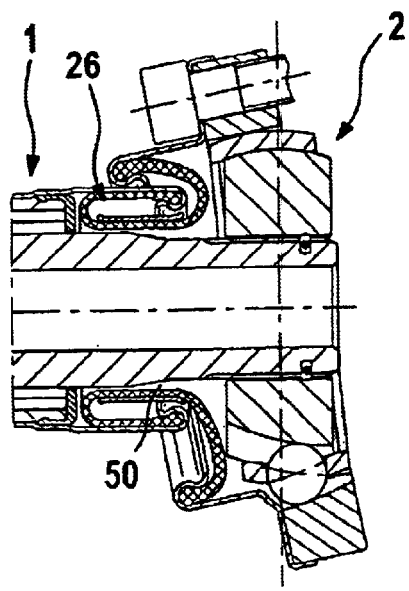

In the articulated position of the constant velocity joint 2, with the plunging assembly 1 simultaneously having reached its maximum plunge, as shown in FIG. 2b, the first attaching part 24 has radially inwardly approached the second attaching part 25 on one side. In the example shown, the two attaching parts 24, 25 are out of contact with one another up to an angle of 11° as enclosed between the outer part 5 and the inner part 6, and only contact one another at larger articulation angles of the constant velocity joint 2.

Figure 3A:
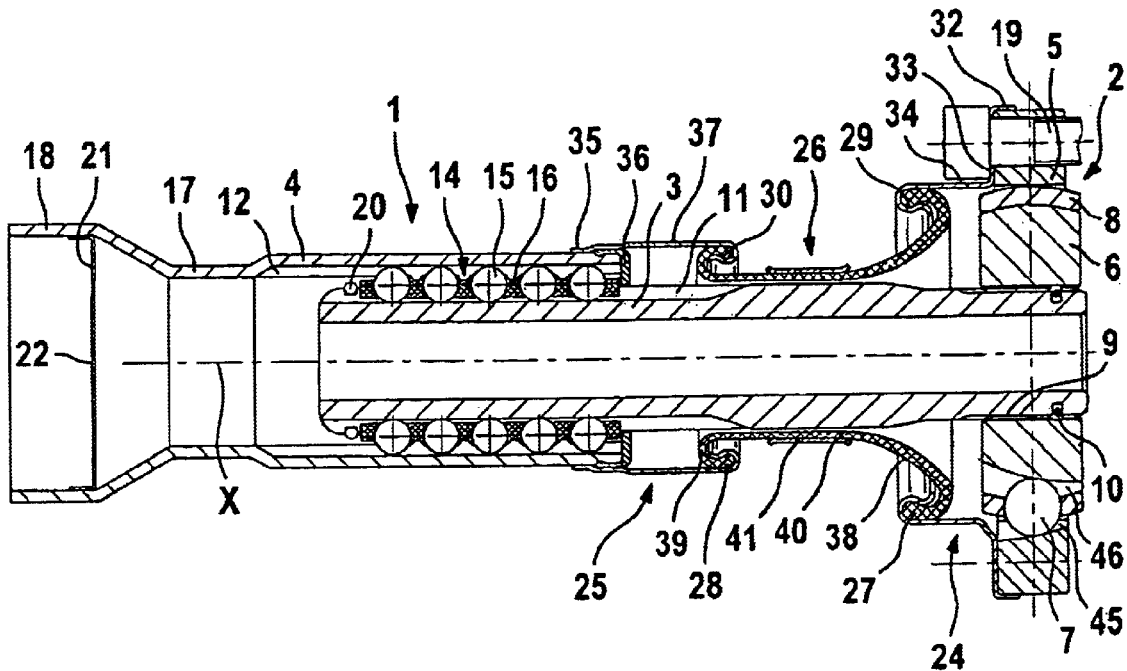

When the journal 3 is moved out of the sleeve 4, the second wall portion 39 unrolls out of the chamber formed by the second attaching part 25 and positions itself annularly around the journal 3. The central wall portion 40 is pulled by the reinforcing ring 41 towards the joint 2, as a result of which the radius of curvature of the first wall portion 38 increases. When the journal 3 is fully extracted out of the sleeve 4, as shown in FIG. 3A, the cage 16, at the shaft end, is in contact with a securing ring 20 and, at the joint end, with the radially inwardly pulled cover 36 underneath the second attaching part 25, as a result of which the journal 3 is prevented from being extracted any further. The second wall portion 39 at the shaft end is nearly completely extracted from the chamber formed by the second attaching part 25 and annularly rests against and around the journal 3. The central wall portion 40 is positioned centrally over the thickening 13 of the journal 3.

Figure 3B:
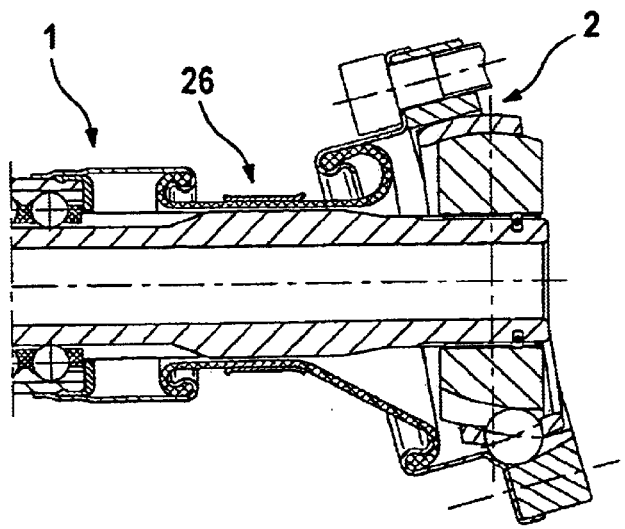

In the articulated position of the constant velocity joint 2, with the plunging assembly according to FIG. 3B being in the fully extended position, the second attaching part 25 no longer prevents the annular movement of the first attaching part 24 with the outer joint part 5 relative to the journal 3. This position thus permits a greater articulation angle than previously, so that the maximum joint articulation angle of approximately 15° is achieved, which is shown here.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A rolling boot (26) comprising:
   a first axially flexible portion (38) comprising a first radially outer collar (27);
   a second axially flexible portion (39) comprising a second radially outer collar (28); and
   an approximately cylindrical connecting portion (40) which adjoins said first and second portions (38, 39) on the radial inside of said first and second portions, and
   wherein the first and second axially flexible portions (38, 39) are axially open towards each other in an annular-shell-like way
   wherein the diameter of the first collar (27) is greater than the diameter of the second collar (28), and the second collar (28) can be introduced into the first portion 38.

2. A rolling boot according to claim 1, wherein the connecting portion (40) includes a reinforcing portion (41).

3. A rolling boot according to claim 2, wherein the reinforcing portion (41) comprises a sleeve resting against the outside of the connecting portion (40).

4. A rolling boot according to claim 2, wherein the reinforcing portion (41) is integrated into the wall of the connecting portion (40).

5. A rolling boot according to claim 2, wherein the connecting portion (40) is axially displaceable relative to an inserted journal (3).

6. A rolling boot according to claim 2, wherein the connecting portion (40) is adapted to be axially secured on an inserted journal (3) by the reinforcing portion (41).

7. A rolling boot according to claim 2, wherein the reinforcing portion (41) comprises a sleeve resting against the inside of the connecting portion (40).

8. A rolling boot according to claim 1, wherein the first and second axially flexible portions (38, 39) each have the shape of half a torus.

9. A rolling boot according to claim 8, wherein a smallest radius of curvature of the first portion (38), in a longitudinal section, is greater than a smallest radius of curvature of the second portion (39) in a longitudinal section.

10. A rolling boot according to claim 1, wherein a smallest radius of curvature of the first portion (38), in a longitudinal section, is greater than a smallest radius of curvature of the second portion (39) in a longitudinal section.

11. A rolling boot according to claim 1, wherein the inside of the connecting portion (40) includes rib- or nap-like reinforcements (55).

12. A rolling boot assembly comprising:
    a rolling boot (26) having a first axially flexible portion (38) comprising a first radially outer collar (27); a second axially flexible portion (39) comprising a second radially outer collar (28) wherein the diameter of the first collar (27) is greater than the diameter of the second collar (28) and an approximately cylindrical connecting portion (40) which integrally connects said first and second portions (38, 39) on the radial inside of said first and second portions; and
    first and second attaching parts (24, 25) wherein the first attaching part (24) comprises a fixing portion (34) which is open at one end towards the second portion (39) of the rolling boot (26) and which, from the outside, tangentially approaches the first portion (38) of the rolling boot (28) in the direction towards the first collar (27), and which serves to receive the first portion (38) of the rolling boot (26), and
    wherein the first and second axially flexible portions (38, 39) are axially open towards each other in an annular-shell-like way.

13. A rolling boot assembly according to claim 12, wherein the first collar (27) of the rolling boot (26) is a bead which engages a corresponding crimping (29) in the first attaching part (24).

14. A rolling boot assembly according to claim 13, wherein the second attaching part (25) comprises a fixing portion (37) which is open at one end towards the first portion (38) of the rolling boot (26) and which, from the outside, tangentially approaches the second portion (39) of the rolling boot (26) in the direction towards the second collar (28), and which serves to receive the second portion (39) of the rolling boot (26).

15. A rolling boot assembly according to claim 14, wherein the second collar (28) of the rolling boot (26) is a bead which engages a corresponding crimping (30) at an end of the second attaching part (25) which is closest to the first portion (38).

16. A rolling boot assembly according to claim 12, wherein the second attaching part (25) comprises a fixing portion (37) which is open at one end towards the first portion (38) of the rolling boot (26) and which, from the outside, tangentially approaches the second portion (39) of the rolling boot (26) in the direction towards the second collar (28), and which serves to receive the second portion (39) of the rolling boot (26).

17. A rolling boot assembly according to claim 16, wherein the second collar (28) of the rolling boot (26) is a bead which engages a corresponding crimping (30) at an end of the second attaching part (25) which is closest to the first portion (38).

18. A rolling boot assembly according to claim 12, wherein the first and the second attaching parts (24,25) are formed from plate metal.

19. A rolling boot assembly comprising:
    a rolling boot (26) having a first axially flexible portion (38) comprising a first radially outer collar (27); a second axially flexible portion (39) comprising a second radially outer collar (28); and an approximately cylindrical connecting portion (40) which adjoins said first and second portions (38, 39) on the radial inside of said first and second portions; and
    first and second attaching parts (24, 25) wherein the first attaching part (24) comprises a fixing portion (34)

which is open at one end towards the second portion (39) of the rolling boot (26) and which, from the outside, tangentially approaches the first portion (38) of the rolling boot (26) in the direction towards the first collar (27), and which serves to receive the first portion (38) of the rolling boot (26), and wherein the first and second axially flexible portions (38, 39) are axially open towards each other in an annular-shell-like way; and wherein the greatest outer diameter of the second attaching part (25) is less than the smallest inner diameter of the first attaching part (24) and wherein, when the first and second attaching parts are articulated relative to one another up to a maximum operating angle between the first attaching part (24) and the second attaching part (25), there exists a radial gap in the region where the attaching parts (24, 25) are closest to each other.

20. An assembly comprising:

at least one plunging assembly (1) comprising a sleeve (4) with outer grooves (12), a journal (3) with inner grooves (11) and balls (15) guided in pairs of outer grooves (12) and inner grooves (11);

at least one constant velocity joint (2) comprising an outer part (5) having outer tracks (45), an inner part (6) having inner tracks (46) and being connected to a journal (3), and torque transmitting members (7); and a rolling boot assembly comprising a rolling boot (26) having a first axially flexible portion (38) comprising a first radially outer collar (27); a second axially flexible portion (39) comprising a second radially outer collar (28) wherein the diameter of the first collar (27) is greater than the diameter of the second collar (28); and an approximately cylindrical connecting portion (40) which integrally connect said first and second portions (38, 39) on the radial inside of said first and second portions, and two attaching parts (24, 25), wherein the first attaching part (24) is connected at one end to the first collar (27) and is connected at the other end to the outer part (5) of the constant velocity joint (2), and wherein the second attaching part (25) is connected at one end, to the second collar (28) and is connected at the other end to the sleeve (4) of the plunging assembly (1).

21. An assembly according to claim 20, wherein the journal (3) of the plunging assembly (1) is directly connected to the inner part (6) of the constant velocity joint (2).

22. An assembly according to claim 20, wherein the constant velocity joint (2) is a fixed ball joint.

* * * * *